United States Patent
Chung et al.

[11] Patent Number: 5,946,284
[45] Date of Patent: Aug. 31, 1999

[54] DISK APPARATUS USING FERROELECTRIC THIN FILM

[75] Inventors: Il-sub Chung, Seoul; In-kyeong Yoo, Suwon, both of Rep. of Korea

[73] Assignee: Samsung Electronics Co., Ltd., Suwon, Rep. of Korea

[21] Appl. No.: 08/905,075

[22] Filed: Aug. 1, 1997

[51] Int. Cl.⁶ .................................................. G11B 7/00
[52] U.S. Cl. ........................................... 369/126; 369/110
[58] Field of Search ............................... 369/126, 54, 58, 369/59, 44.11, 44.14, 13, 47, 48, 49, 110; 250/306, 307

[56] References Cited

U.S. PATENT DOCUMENTS 5,777,977 7/1998 Fujiwara et al. ...................... 369/126
5,793,743 8/1998 Duerig et al. ........................... 369/126

*Primary Examiner*—Muhammad Edun
*Attorney, Agent, or Firm*—Burns, Doane, Swecker & Mathis, L.L.P.

[57] ABSTRACT

In a disk apparatus using a ferroelectric thin film coated on the surface of a disk as a recording medium, an electrode layer is formed on a substrate and the ferroelectric thin film is formed on the electrode layer, thereby forming a disk. A head is installed on an arm over the disk. The head has a reflector, and a microtip electrode, for creating or erasing polarization of the ferroelectric thin film. An optical system is provided over the head. The head moves towards or away from the disk depending on recorded information (polarization direction), and the movement is read by the optical system. Therefore, a low-priced disk apparatus, capable of freely recording and reproducing information semipermanently, is realized.

5 Claims, 4 Drawing Sheets

DISK APPARATUS USING FERROELECTRIC THIN FILM

BACKGROUND OF THE INVENTION

The present invention relates to a disk apparatus, using a ferroelectric thin film as a recording medium, wherein the ferroelectric film is coated on a disk surface.

FIG. 1 is a schematic construction view of a conventional disk apparatus including a laser diode 1 being an optical source; a collimating lens 2 for collimating a laser beam emitted from the optical source 1; a beam splitter 3 for passing the collimated light received from the collimating lens 2 to an objective lens 4 and for passing reflected light from a disk surface and passed through the objective lens 4, toward an optical detector 7; the objective lens 4 for focusing the collimated light received from the beam splitter 3 onto the track of a disk surface up to a diffraction limit wherein the objective lens 4 is positioned by a lens movement mechanisms; a disk 8 on which information is recorded by a pit or optical magnetism; a focusing lens 6 for focusing reflected light, split by the beam splitter 3, onto an optical detector 7; and the optical detector 7 for transforming the light received from the focusing lens 6 into an electric signal.

In the disk apparatus having such a configuration, a laser beam, emitted by the optical source 1, is incident on the optical detector 7 in order to detect pits formed on the surface of the disk 8. That is, as shown in FIG. 2, a disk surface has pits thereon in order to record information. The pits are of a depth of ¼ of the laser's optical wavelength ($\lambda$), i.e., $\lambda/4$. Only light having an optical path difference of $\lambda/2$ is split by the beam splitter 3 and reaches the optical detector 7. Thus, the optical detector 7 can detect pits formed on the disk surface.

However, the disk apparatus using such a recording structure requires a separate device for forming the pits, and a separate method therefor, in order to record information on a disk surface. The separate method and device are different to those required from read information from the disk surface. Therefore, only information written and recorded on a disk by a producing company can be utilized, and storage and utilization of individual's information, for instance is difficult.

An optical magnetism type disk apparatus does not need a separate recording device for recording personal information, so convenience is provided, but the price of this technology is very high.

SUMMARY OF THE INVENTION

To solve these problems, it is an object of the present invention to provide a very low-priced disk apparatus which can freely record or read personal without need for separate reading and recording equipment.

To accomplish the object, there is provided a disk apparatus or memory comprising: a disk or medium including a substrate, an electrode layer formed on the substrate and a ferroelectric layer; a head, for recording information by forming polarized domains on the ferroelectric layer, and for reading information by moving a predetermined distance in a direction perpendicular to the disk surface according to the polarity of each of the polarized domains; and an optical system for detecting the recorded information by recognizing a light path difference depending on the movement of the head.

According to the present invention, preferably, the ferroelectric layer ensures a recording density of more than or equal to 10 Mbit/mm².

It is preferable that the optical system comprises: an optical source; a collimating lens for collimating light emitted by the optical source; a beam splitter, for passing the collimated light therethrough, and for splitting light reflected by the reflector; an objective lens for focusing the collimated light on the reflector up to a diffraction limit; a focusing lens for focusing the reflected light; and an optical detector for transforming the focused, reflected light into an electric signal.

Preferably, a bar-shaped electrode for erasure is further provided on the upper portion of the disk.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
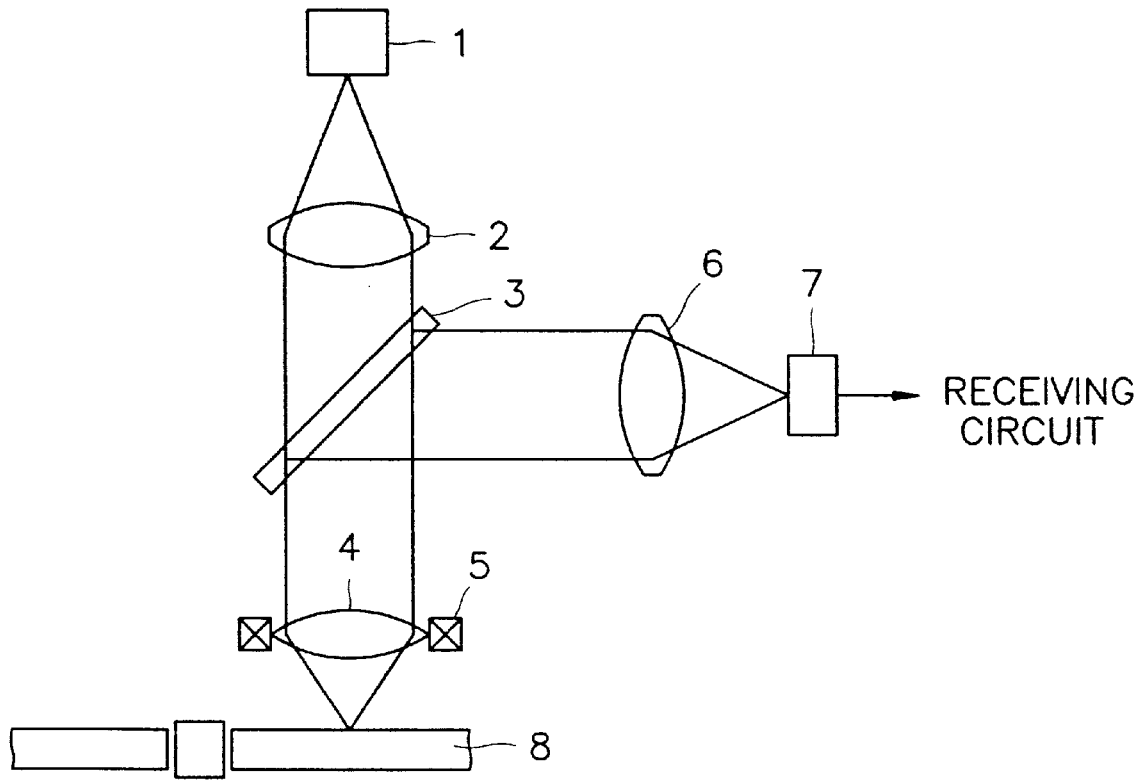
FIG. 1 is a schematic construction view of a conventional disk apparatus.
Figure 2:
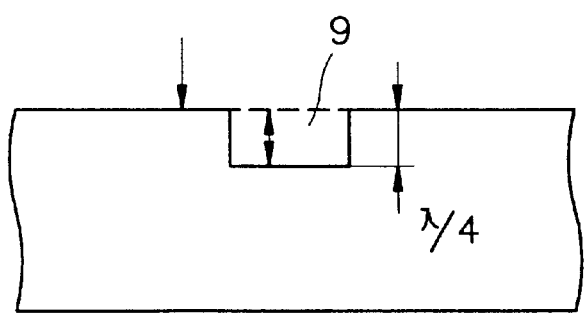
FIG. 2 is an expanded sectional view of the disk shown in FIG. 1.
Figure 3:
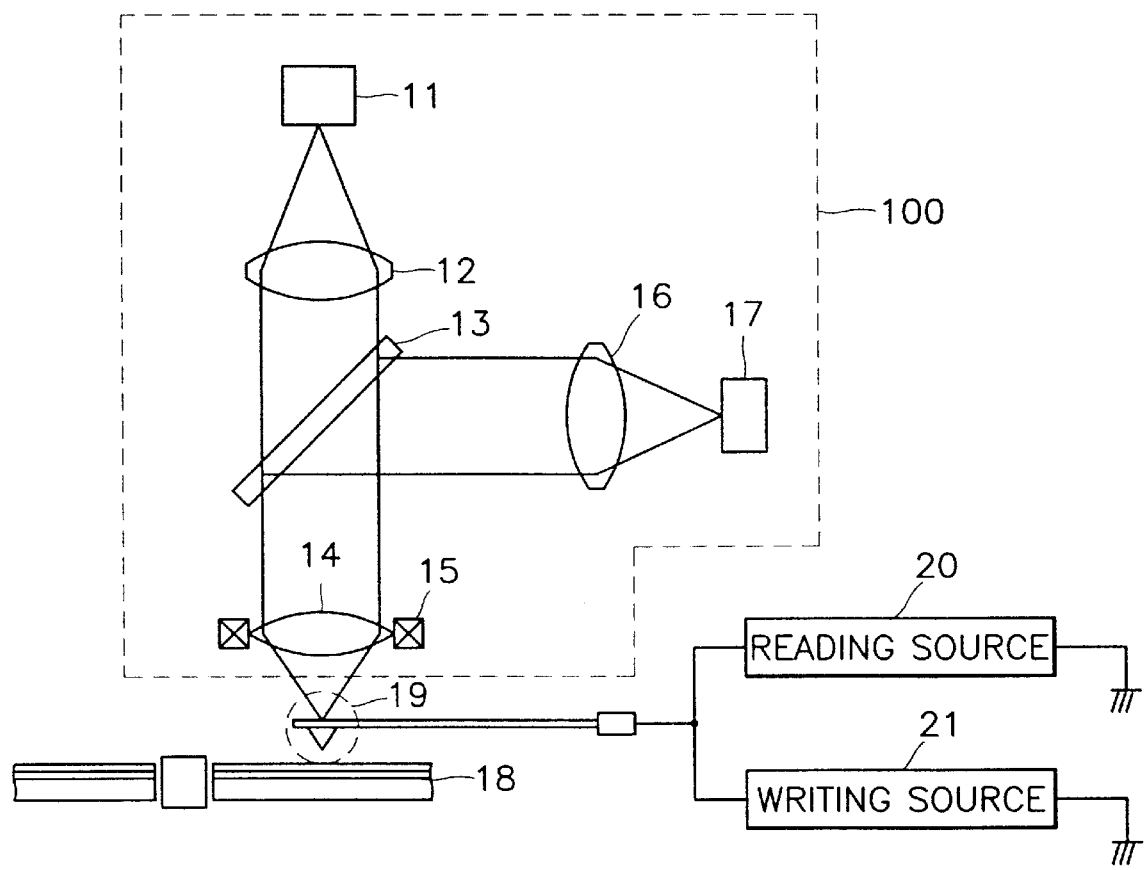
FIG. 3 is a schematic construction view of a disk apparatus using a ferroelectric thin film, according to the present invention.

Referring to FIG. 3, a disk apparatus according to the present invention can be divided into a disk 18 provided with a ferroelectric layer for information recording, a head 19 for recording or reading information onto and from the ferroelectric layer, and an optical system 100 for detecting the recorded information.

Figure 4:
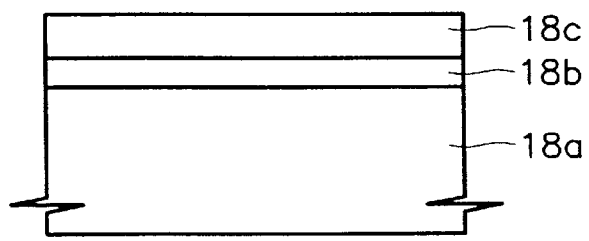
FIG. 4 is an expanded sectional view of the disk shown in FIG. 3.
Figure 5:
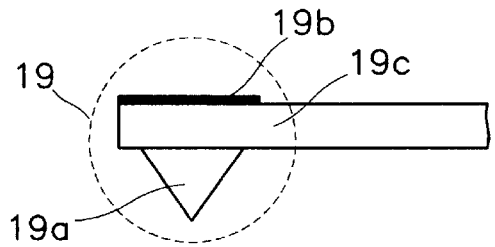
FIG. 5 is an expanded sectional view of the head portion shown in FIG. 3.

Here, as shown in FIG. 4, the disk 18 has an electrode layer 18b, and a ferroelectric layer 18c having information recorded therein by a polarized domain, sequentially stacked on a circular substrate 18a. As shown in FIG. 5, the head 19 is provided with a microtip 19a for recording information by directly forming the polarized domain in the ferroelectric layer 18c, and for reading information while moving up or down by ¼ of an optical wavelength in a direction perpendicular to a disk surface, according to the polarities of the polarized domain; a reflector 19b for reflecting light; and an arm 19c for supporting the microtip 19a and the reflector 19b. The optical system 100, for detecting recorded information by recognizing an optical path difference depending on the vertical movement of the head, includes a laser diode 11 being an optical source; a collimating lens 12 for collimating laser beam emitted from the optical source 11; a beam splitter 13, for passing the collimated light therethrough, and for reflecting light reflected by a reflector 19b; an objective lens 14 for focusing the collimated light onto the reflector 19b of the head 19 up to a diffraction limit with the assistance of a lens positioning mechanism 15; a focusing lens 16 for focusing light reflected by the beam splitter 13; and an optical detector 17 for transforming the reflected light, focused by the focusing lens 16, into an electric signal.

The operation of the above-constructed disk apparatus using a ferroelectric thin film will be described referring to FIGS. 6 through 10.

Figure 6:
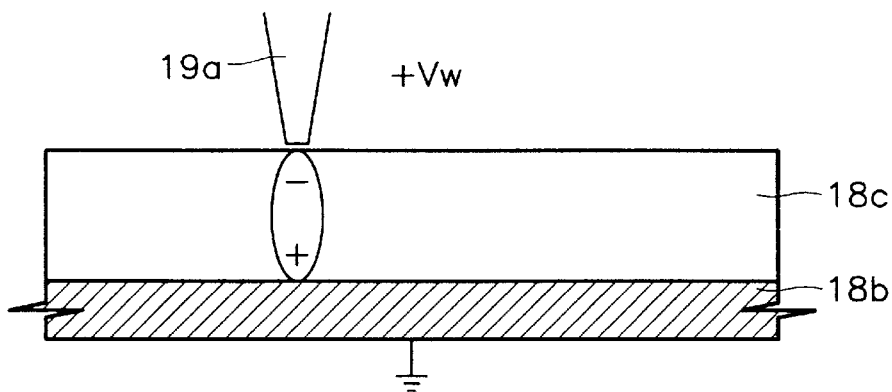
FIGS. 6 through 10 explain writing and reading principles of the disk apparatus using a ferroelectric thin film of FIG. 3.
Figure 7:
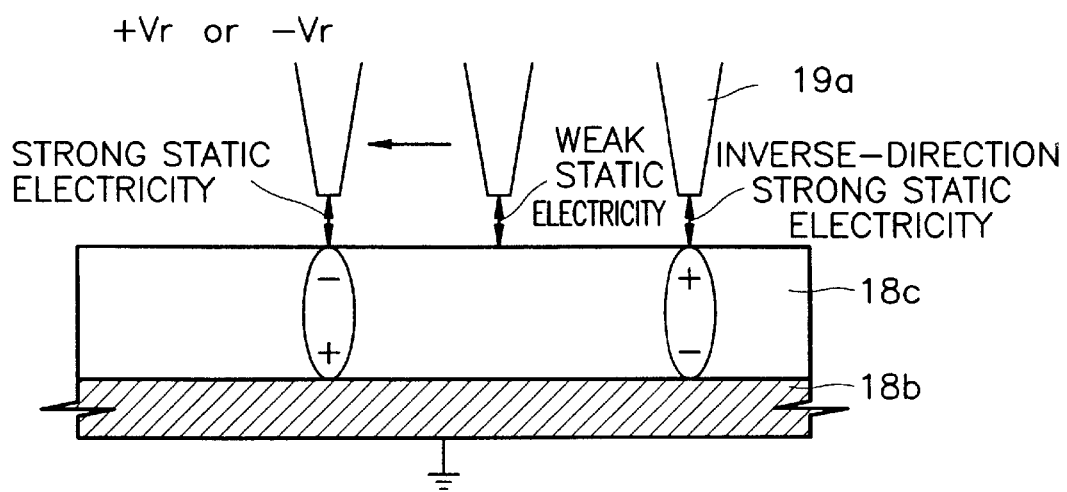

The ferroelectric layer is polarized by applying a predetermined voltage (Vw) thereto between the microtip 19a and the grounded electrode layer 18b, so that polarized domains are formed. Here, the domains attract charge due to their own polarity, to maintain an electrical balance. When a charge establishes a balance after being attracted to a domain, it becomes a bound charge. However, if there is no charge to be bound, the domain trys to attract charge, so it exhibits static electricity. At this time, portions of the domains have different static electricity to portions of unpolarized domains or of opposite-polarity domains. Information is recorded in consideration of the above fact by polarizing a predetermined portion of the ferroelectric layer using the microtip 19a as shown in FIG. 6, and by leaving or inversely polarizing the residual portions. Then, the polarized portion and the unpolarized and inversely-polarized portions can be discriminated from each other by recognizing their respective static electricity, according to the movement of the microtip to which a certain voltage (+Vr or −Vr) is applied, as shown in FIG. 7. That is, FIG. 6 shows the polarization of cells on the ferroelectric thin film 18c, deposited on an electrode plate 18b, using a microtip electrode 19a. Domains are formed in the polarized cells so that the cells have static electricity. When the recorded ferroelectric film is scanned by equipment such as a scanning capacitance microscope, atomic force microscope, etc., a difference in static electricity can be recognized according to whether domains are made or not and which polarity the domains have, as shown in FIG. 7. Thus, the ferroelectric film 18 c can be used as a recording medium, and, considering that the size of the microtip 19a is of the order of $10^{-9}$, a recording density of about 10 Mbit/mm$^2$ can be ensured. Furthermore, while the conventional disk cannot be repetitively recorded, the disk using the ferroelectric layer 18c can be repetitively recorded since the polarization of the ferroelectric layer can be changed. Although the ferroelectric substance wears due to repetitive recording operations, at least a million recording repetitions is possible. Since a polarized portion has high retentivity, a semi-permanent preservation (more than 10 years) is possible.

As described above, the ferroelectric substance is non-volatile and makes re-recording possible, so it can be applied to a superhighly integrated, re-recordable disk.

Figure 8:
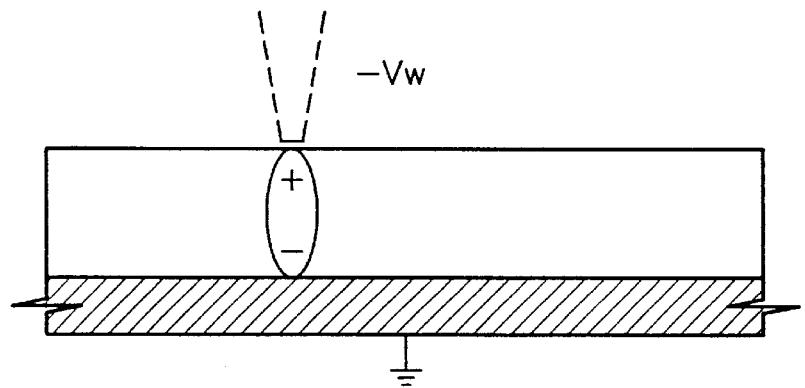
Figure 9:
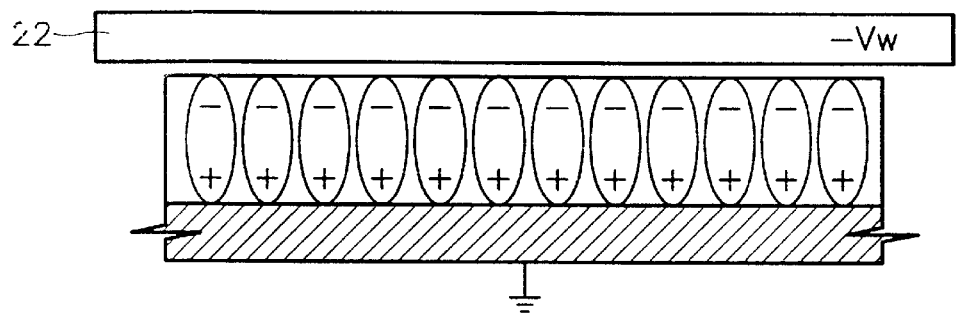

Also, a method for deleting information recorded on the ferroelectric film, in order to accomplish the above recording and reproduction, is shown in FIGS. 8 and 9. FIG. 8 shows deletion of each polarized cell, and FIG. 9 shows a method for deleting recording areas using a plate (e.g., a circular electrode) or electrode 22 to which a predetermined voltage (−Vw) is applied.

Figure 10:
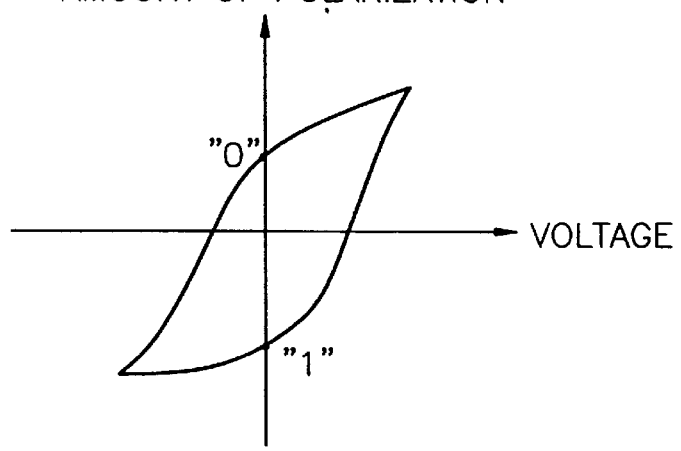

In the disk using a ferroelectric film, recorded information is divided into "1" and "0" according to the direction of polarization, as shown in FIG. 10. As described above, the difference in polarization direction lifts or lowers the microtip, in the disk apparatus constructed as shown in FIG. 3, during information reproduction. It does this by providing different static electricity to the microtip of the head, to which a predetermined voltage (+Vr or −Vr) is applied. Accordingly, the path of light, incident onto a reflector attached to the upper surface of the microtip through the objective lens in the optical system, differs according to the up and down movement of the microtip which are due to the direction of polarization (recorded information). Among the reflected light, light having a phase shifted by 90° with respect to the phase of the incident light is split by the beam splitter and detected by the optical detector. Thus, information, recorded as polarization directions of the ferroelectric film of the disk, is recognized by the optical detector.

As described above, in the disk apparatus using a ferroelectric thin film, according to the present invention, an electrode layer is formed on a substrate and a ferroelectric thin film is formed on the electrode layer, thereby forming a disk. A head having a microtip electrode and a reflector is installed on an arm over the disk. The microtip electrode is for creating or erasing polarization of the ferroelectric thin film. An optical system is provided over the head. The head ascends or descends depending on recorded information (polarization direction), and the variation is read by the optical system. Therefore, a low-priced disk apparatus, capable of freely recording and reproducing information semipermanently, can be realized.

What is claimed is:

1. A memory apparatus comprising:

a memory medium including a substrate, an electrode layer formed on said substrate and a ferroelectric layer;

a head including a microtip, for recording information by forming polarized domains in said ferroelectric layer, and for reading information by moving a distance of ¼ wavelength of light emitted from an optical source in a direction perpendicular to a surface of said memory medium according to the polarity of each of said polarized domains and a reflector for reflecting light incident from the optical source; and an optical system for detecting said recorded information by recognizing a light path difference depending on the movement of said head, wherein said optical system comprises:

said optical source;

a collimating lens for collimating light emitted by said optical source;

a beam splitter for passing said collimated light therethrough, and for splitting light reflected by said reflector;

an objective lens for focusing said collimated light on said reflector up to a diffraction limit;

a focusing lens for focusing said reflected light; and an optical detector for transforming said focused, reflected light into an electric signal.

2. An apparatus as claimed in claim 1, wherein said ferroelectric layer provides a recording density of at least 10 Mbit/mm$^2$.

3. An apparatus as claimed in claim 1, further comprising a bar-shaped electrode for erasure adjacent an upper portion of said memory medium.

4. An apparatus as claimed in claim 1, further comprising an electrode for erasure adjacent an upper portion of said memory medium.

5. An apparatus as claimed in claim 1, wherein said memory medium is a disk.

* * * * *